Figure 1:
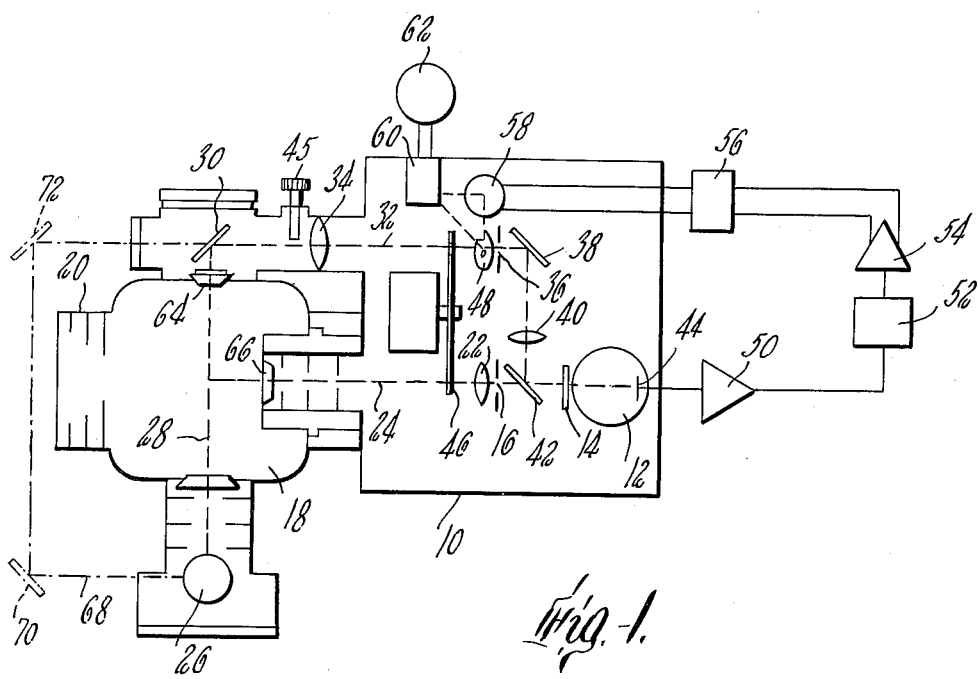

Dec. 19, 1961    M. KAYE    3,013,466
TURBIDITY MEASURING INSTRUMENT
Filed July 18, 1957

United States Patent Office 3,013,466
Patented Dec. 19, 1961

3,013,466
TURBIDITY MEASURING INSTRUMENT
Morton Kaye, South Norwalk, Conn., assignor, by mesne assignments, to Baird-Atomic, Inc., Cambridge, Mass., a corporation of Massachusetts
Filed July 18, 1957, Ser. No. 672,617
2 Claims. (Cl. 88—14)

This invention relates to apparatus for the measurement of light which appears at an angle to an illuminating beam for the measurement, for example, of the quantity of solids carried in suspension in fluids.

A well-known category of instruments operate on the principle of measuring the absolute value of the radiant energy transmitted through a medium under test. Instruments of this type have commonly been used for the detection of minute solids suspended in fluids. Apparatus of this general category employs a source of light, a beam of which is directed through the substance under examination. The absolute value of the intensity of the transmitted beam is measured and thus an indication of the amount of particles suspended in the fluid may be obtained as the reduction in the transmitted energy is due primarily to the scattering of the light by the suspended particles. Such devices, however, are inherently subject to drift or error from external causes such as lamp aging, line voltage variations, ambient temperatures, amplifier gain instability, and similar environmental conditions. Compensating circuitries to overcome the possibilities of erroneous indications caused by these factors are complex, expensive and difficult to maintain. An additional and significant source of error is caused by variations in color of the fluid under examination, as such variations affect any detector which is sensitive to changes in frequency of the light incident upon it. Such changes in frequency give rise to errors which impair the accuracy and reliability of the instruments and, in particular, render them unsuitable for continuous monitoring and control of industrial processes.

Accordingly, it is an object of the invention to provide a simple, accurate and reliable apparatus for the analysis of certain materials through which a beam of radiant energy may be transmitted, for example, the quantitative evaluation of particles suspended in fluids.

Another object of the invention is to provide an apparatus which includes a continuous reference standard integral with the apparatus.

Another object of the invention is to provide a novel apparatus which utilizes a beam of radiant energy transmitted through the medium under examination and which is not subject to drift and error from external causes such as lamp aging, line voltage variations, and changes in ambient temperature, or to changes in the color or light transmissivity of the material under test.

Another object of the invention is to provide a new and novel instrument which utilizes a beam of radiant energy transmitted through the medium under test and may easily be inserted into relation with a process line to continuously monitor the process.

The invention provides an instrument which includes a single energy source to provide a measurement, for example, of the quantity of suspended particles in a fluid. A primary beam of light from a source is directed through the fluid and the amount of light scattered in a predetermined direction is compared with a primary beam of light from the same source, used as a reference beam. In this manner, errors due to changes between the energy source and an independent standard are eliminated. In the preferred embodiment, a beam of light from the single source is directed through the fluid under examination and the portion of the beam that passes directly through the medium is utilized as a reference. Depending on the quantity of suspended particles present in the medium, a certain portion of light in the beam is deflected (scattered) by the particles. The energy of the deflected portion is compared with the energy of the reference over an equal path length through the medium and a quantitiative measurement of the particles in suspension is obtained. In this manner, changes in the color or light transmissivity of the fluid do not affect the measurement as both the scattered beam and the reference beam (emanating from the same source and containing the same frequency components) are affected in the same way. Alternatively, a beam of the light from the same source but not directed through the medium may be used as the reference and its energy compared with the scattered portion to obtain the desired measurement. By this method, variations in the intensity of the light source do not affect the measurement as both beams emanate from the same source, but changes in the color of the material under examination do adversely affect the validity of the measurement. This method is preferable when there is an excessive attenuation of the reference beam through the fluid. In either event, it is important that both beams, that is, the scattered beam and te reference beam, whether or not the latter pass through the fluid, be detected by a single means to avoid any possibility of error. This may be accomplished by alternately applying each beam to the detector, as by a chopper, and comparing the relative energy of the beams, as by varying one in a known manner, until the energy of both beams, as shown by the detector output, is equal. This comparison of the beams to provide a simple and effective measurement may be accomplished by attenuating either the scattered beam or the reference beam.

The foregoing and other objects, features and advantages of the invention will more fully appear from the ensuing particular description of the preferred embodiment taken in conjunction with the accompanying drawings, wherein:

FIG. 1 is a diagrammatic view of the optical apparatus associated with the preferred embodiment of the invention and of the electrical circuitry utilized therewith; and FIG. 2 shows examples in graphical form of the light energies received by the photomultiplier tube of the apparatus of FIG. 1 under representative conditions.

With reference to FIG. 1, the optical apparatus is enclosed in a casing 10. A photomultiplier tube 12 is placed in optical alignment with a diffusing screen 14, a slit 16, a test cell 18 and a dark field 20. A lens 22 focuses the interior of the cell 18 on the target of the photomultiplier tube 12. These elements are aligned along a field path 24. A lamp 26 is mounted on a path 28 which is at right angles to the field path 24. The path 28 intersects the field path 24 in the test cell 18. The geometry of the test cell 18 and the dark field 20 must be such to absorb all scattered light except that passing directly along the field path 24 from the intersection with path 28. Thus, light scattered by particles in the fluid in the test cell in the area of the intersection of paths 24 and 28 is focused on the target of the photomultiplier tube 12.

On the opposite side of the cell 18 from the lamp 26 in alignment with path 28 is mounted a mirror 30. The mirror 30 reflects the beam of light from the lamp 26, after it has passed through the test cell 18, into a path 32 parallel to the field path 24. A lens 34 mounted along path 32 focuses the light beam on a reference slit 36. A mirror 38, lens 40 and beam splitter 42 focus the beam of light passing through the reference slit 36 on the photomultiplier target 44. An adjusting means 45 is utilized to control the light in beam 32 to an amount to which the apparatus can effectively respond.

Thus, the portion of light energy which is scattered by suspended particles in the fluid in the test cell 18 is transmitted along path 24 through the beam splitter 42 and that portion of light energy which passes directly through the cell 18 is transmitted along path 32 through the beam splitter 42. By means of this device the light energies in paths 24 (scattered) and 32 (directly transmitted) are superimposed on the photomultiplier target 44. The scattered beam of light has an energy which is a function of the quantity of particles suspended in the fluid contained in the test cell and may be compared with the transmitted or reference beam. The relative light energies of these beams provides a means to evaluate the quantity of particles suspended in the fluid and the validity of this evaluation is not affected by changes in the light source or changes in the color or similar ancillary conditions of the fluid under examination.

Figure 2A:
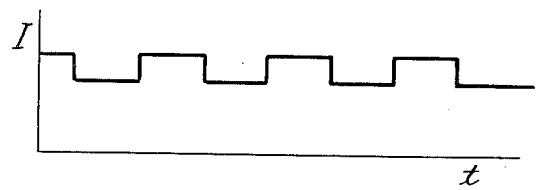
Figure 2B:
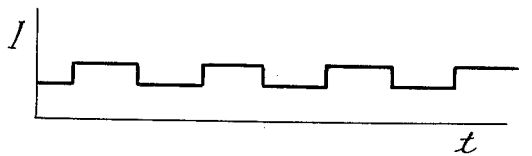

To provide a comparison of the energies in the beams, a motor-driven chopper plate 46 is mounted such that in rotation it alternately opens and closes paths 24 and 32 to chop the light energies in these paths 180° out of phase with each other. This alternate opening and closing of the paths occurs at a rate of 60 cycles per second in the preferred embodiment. The amount of light energy impinging upon the photomultiplier target 44 may be indicated by the graphs in FIGS. 2a, b, and c. When the intensities of the light are equal in both paths the light falling on the target 44 is steady with no flicker at the chopping frequency, but when the light in the paths 24 and 32 are unequal in intensity, a flicker appears at the chopping frequency. In FIG. 2a, the amount of light energy in path 32 is greater than the light energy in path 24. This light energy produces a current from the photomultiplier tube which has a 60 cycle value superimposed on a D.C. level. Under the conditions of FIG. 2a, the D.C. level is that amount of current produced by the light energy in beam 24 and the peak of the 60 cycle value is the current produced by the light energy in path 32. If the light energy in path 32 should be less than the light energy in path 28, the waveform will be similar to that shown in FIG. 2b. In this case, D.C. value of current is produced by the light energy in path 32 and the 60 cycle value by the light energy in path 24. It is to be noted that waveforms in FIGS. 2a and 2b are 180° out of phase. The chopper 46 is preferably oriented so that when the intensity of light energy in the reference path 32 is greater than the intensity of light energy in the scattered path 24, the 60 cycle component leads the line current by 90°, and when the intensity of the light energy in the reference path 32 is less than the energy intensity in the scattered path 24, the 60 cycle component lags the line current by 90°. This 60 cycle signal with variable phase and magnitude is utilized as an indicator of unbalance in the system.

Figure 2C:
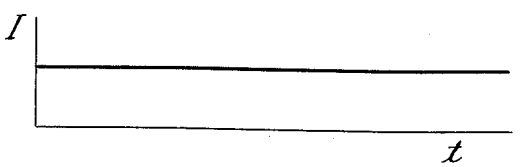

A shutter cam 48 or similar means, such as a variable density filter, is placed in the reference path 32, in the plane normal to the path. The cam 48 is rotatable and, in cooperation with the slit 36, provides graduated attenuation of the light beam by adjusting the effective dimensions of the slit 36. When the light energy in the beams falling on the photomultiplier target 44 are unequal, the cam is rotated to equalize the light energy in the beams applied to the photomultiplier target 44. The 60 cycle signal then disappears and the light energy, as seen by the photomultiplier tube 12, produces only a D.C. level as shown in FIG. 2c.

Within the limits of the system, no matter how much light is scattered into path 24, there is some position of the cam 48 which will allow an equal amount of light to arrive via the reference path 32. The position of the cam 48 at balance is a direct function of the scattered light.

A feedback loop controls the cam 48 and positions it such that the energies in paths 28 and 32, as seen by the photomultiplier tube 12, are equal.

The output of the photomultiplier tube 12 is fed through an amplifier 50, a 60 cycle filter 52, and amplifiers 54 and 56. Depending upon the phase relationship of the 60 cycle component to the line current, the servo motor 58 is operated to rotate the cam 48 in the direction to equalize the light energies impinging on the target 44 of the photomultiplier tube from the reference path 32 and the scatter path 24. When the photomultiplier tube 12 produces no 60 cycle signal the energies are equal and the position of the cam 48 under this condition is a direct function of the light in beam 28. A potentiometer circuit 60, mechanically connected to the cam 48, is adjusted such that the voltage appearing at the arm of the potentiometer 60 is an indication of the position of the cam 48 and thus of the quantity of particles suspended in the fluid in the test cell. This voltage is fed into a metering system which may include a meter 62, calibrated in parts per million, or into associated equipment such as a recorder or a controller.

Alternatively, a beam of light from the source 26 may be transmitted along a path 68 external of the test cell. This beam of light is reflected by a mirror 70 and by a mirror 72 and subsequently falls on the target 44 of the photomultiplier tube 12 as does scattered light in path 24. The beam of light in path 28 is not utilized as a reference in this embodiment but the same components, i.e., an adjusting means, a first lens, a chopper, a cam, a slit, and a second lens, are necessary to control the light in path 68. The operation of this apparatus is the same as in the previously described embodiment in that the amount of light in the reference beam (path 68) is adjusted to equal that in the scatter beam (path 24) and when the beams are equalized the position of the cam is a direct function of the number of particles carried in suspension in the test cell. This embodiment is preferable where the number of suspended particles is comparatively high—in the range of 60 p.p.m. However, this embodiment is not automatically compensated for changes in color of the fluid.

The apparatus of the invention utilizes the principle of comparing a resultant beam of radiant energy produced at an angle to that of a beam of energy incident on the material under analysis with a beam of energy from the same source. Although described in conjunction with apparatus for measuring the quantity of particles carried in suspension in a fluid, the principle of the invention is susceptible to other applications, such as measuring fluorescence. And, although the preferred embodiments utilize a resultant beam at 90° from the incident beam, other angles may be used.

The invention provides an accurate indication of a quality of the material under analysis, such as the quantity of particles suspended in a fluid. It may be inserted in a process line and a continuous analysis may be obtained. The apparatus is suitable for many industrial applications, including the continuous analysis of sea water or oil for the quantity of particles carried in suspension, and when enclosed in a suitable housing, it may be used in hazardous areas without danger.

It will be understood that while there have been shown and described herein the preferred embodiments, the invention is not intended to be limited thereby or to all details thereof, and departures may be made therefrom within the spirit and scope of the invention as set forth in the appended claims.

I claim:

1. Apparatus for measuring the relative suspension of solid particles in a fluid including a test cell adapted to contain the material to be tested, a light source arranged to direct a beam of light through said test cell such that a first portion of said beam consists of rays passing through said material in a straight line and a second portion consists of rays scattered by particles suspended in said material, a light responsive device, means to direct said first and second portions so that each portion impinges on said light responsive device, means to repetitively interrupt said first and second portions such that the light from said first and second portions impinge on said light responsive device alternately in time, adjusting means responsive to said light sensitive device to control the amount of light in said first portion, means to position said adjusting means such that the part of said first portion impinging on said device is equal to said second portion wherein the position of said adjusting means provides a measurement of the quantity of particles suspended in said fluid.

2. Apparatus for the quantitative evaluation of the suspended particles in a fluid medium comprising a test chamber adapted to contain a sample of the fluid to be analyzed, a source of radiant energy adapted to produce a single beam which is directed into the test chamber such that it may be divided into a first portion of radiant energy which appears at a fixed angle relative to said beam due to scattering produced by suspended particles and a second portion which passes straight through said test cell, means to alternately interrupt said portions, a radiant energy detector, means to direct said portions such that they impinge on said detector, attenuation means interposed in the path of said second portion, and means responsive to said detector adapted to adjust said attenuation means to attenuate said second portion such that said first and second portions impinge on said detector in equal intensity, the position of said attenuation means, when so adjusted, being adapted to indicate the quantity of particles suspended in said fluid sample.

References Cited in the file of this patent

UNITED STATES PATENTS

| | | |
|---|---|---|
| 2,045,124 | Cummins et al. | June 23, 1936 |
| 2,301,367 | Cahusac et al. | Nov. 10, 1942 |
| 2,528,924 | Vassy | Nov. 7, 1950 |
| 2,858,727 | Stamm et al. | Nov. 4, 1958 |
| 2,873,644 | Kremen et al. | Feb. 17, 1959 |

FOREIGN PATENTS

| | | |
|---|---|---|
| 661,425 | Great Britain | Nov. 21, 1951 |
| 169,767 | Austria | Dec. 27, 1951 |